Patented Mar. 26, 1946

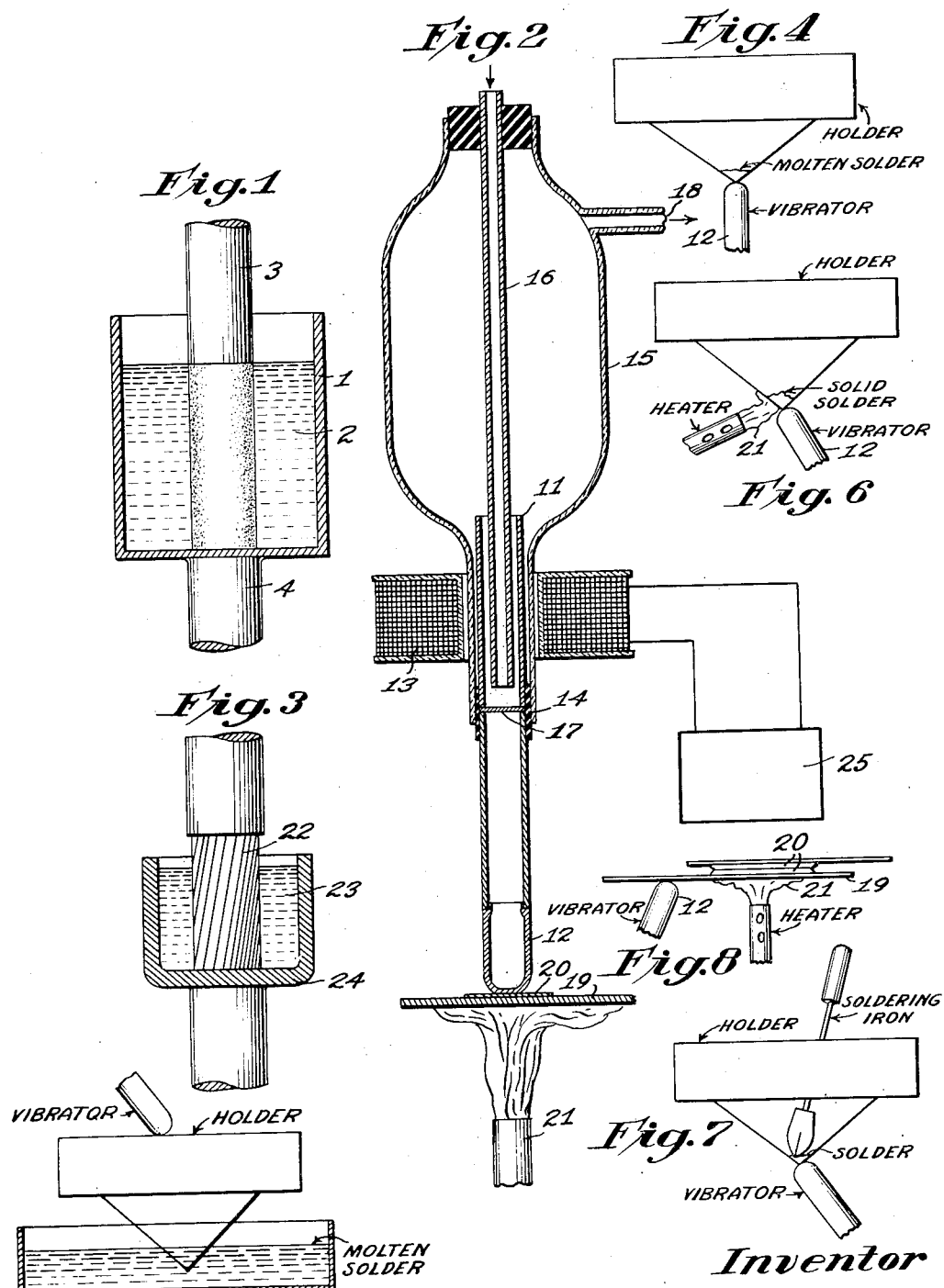

2,397,400

UNITED STATES PATENT OFFICE 2,397,400

APPARATUS FOR AND METHOD OF PRODUCING METALLIC COATINGS

Heinz Barwich, Berlin-Halensee, Germany; vested in the Alien Property Custodian

Application May 27, 1939, Serial No. 276,257
In Germany May 27, 1938

18 Claims. (Cl. 113—112)

This invention relates to a method of producing metallic coatings on bodies consisting of any materials. The primary object of the invention is to provide a metal body with an adhesive metallic coating including bodies made of different materials.

It has not been possible hitherto to produce bodies made of different materials with surface layers consisting of any desired metal, since in many cases the metals do not adhere to the bodies in a uniform manner and in some cases only to a slight extent or not at all, depending upon the nature of the body to be provided with the coating. This fact makes it difficult, for instance, to produce soldered joints between bodies consisting of certain metals to which the layer of solder adheres only to a very slight extent.

The invention provides means, whereby the production of adhesive metallic coatings on any desired bodies is made possible for different purposes; for instance, for the production of soldered joints.

According to one embodiment of the invention such bodies may be coated by immersing them in molten metal and setting them in rapid mechanical vibration. It has also been found that very good adhesive metal coatings may be produced when using bodies and coating metals on which it has hitherto been impossible to produce adhesive metal coatings. The effect of the present method is due to the fact that the surface of the bodies is rendered to a considerable extent absorptive with respect to the coating metal by the mechanical vibrations despite the presence of surface oxide layers on the metal bodies or in the case of insulating bodies, the presence of the particles which cover the pores of the insulating bodies.

Fig. 1 shows in section an arrangement for producing a metallic coating on a body of any desired material, such as insulating material, for example;

Fig. 2 is a section through an apparatus adapted for use in transmitting rapid mechanical vibrations to parts to be coated or soldered;

Fig. 3 shows in section an arrangement for coating or soldering the ends of stranded conductors or cables;

Figure 4 is a diagrammatic view showing performance of the method of the invention involving holding two metal plates or other metal objects edgewise together with molten solder and the vibratory element applied at the juncture thereof;

Figure 5 is a similar view of another embodiment of the invention wherein the metal plates are immersed in solder and the vibratory element is applied to the holder of the plates or the like;

Figure 6 is a similar view of an embodiment of the invention related to Figure 4 but differing therefrom in that the solder is melted in situ by use of a torch or the like;

Figure 7 is a similar view of another embodiment of the invention wherein the plates are in side by side relation with the solder therebetween constituted by solder coatings thereon, and brought to molten state by application of heat to one of the plates, the solder coatings having been provided on the plates in a manner in accordance with the present invention; and Figure 8 is a similar view of a further embodiment of the invention illustrating the soldering together of two objects, such as metal plates having solder coatings previously applied thereto in accordance with the present invention, by heating the plates to fuse the coatings together.

Referring to Fig. 1, the vessel 1 is made of metal and contains the bath of molten metal 2. The insulating rod 3 is immersed in the bath to such an extent as to touch the bottom of the vessel. The rod 3 is set in rapid longitudinal mechanical vibration through a support 4 secured to the vessel 1. In this case a compact and good adhesive metallic coating which withstands also high mechanical and thermal stresses is produced on the insulating body. Of course, it is not necessary as shown in Fig. 1 to set the rod 3 in vibration by means of the vessel 1; the rod may be clamped in a suitable gripping device through which the mechanical oscillations may be imparted to the rod. Depending upon the circumstances, particularly as regards the shape of the body to be coated, the expansion of the surface thereof and the resistance of the body, preference is given to the one or the other method.

As already above mentioned, the method according to the invention may also be employed to a great advantage for the production of soldered joints between bodies of any desired metals, particularly of easily oxidizable metals. In these bodies it has hitherto been always difficult or impossible to produce strong soldered joints, since there is always a more or less fine oxide layer on the surface of the body, preventing the solder from adhering to the surface. However, if the junction of the bodies is set in rapid mechanical vibrations with the method according to the invention, then the molecules of the fine film of oxide and of the surface of each body become rearranged so that the solder may come into direct contact with a metallic surface of the body and firmly adhere thereto.

The novel method is adapted for use in the production of soldered joints between various metals and alloys; thus, for instance, for soldering aluminum in an advantageous manner, which has been hitherto only possible by the use of expensive special solders. The method may also be employed to advantage for soldering aluminum alloys, iron alloys, as well as highly refractory metals.

The mechanical vibrations may be imparted to the bodies to be soldered in different ways. It is particularly advantageous to set any body, for instance, a tube in vibration and, during the soldering process or during the application of the solder to its surface to bear the metal body against the tube so as to impart the vibrations of the tube to the body. This may be accomplished, for instance, by the arrangement shown in Figure 2 of the drawing.

In this figure, 11 denotes a nickel tube, to the lower end of which is hard-soldered a copper extension tube 12 closed at the lower end thereof. A solenoid 13 energized by high-frequency currents supplied by a high-frequency transmitting device 25 is arranged near the upper end of the nickel tube 11. By the action of the solenoid 13 the tube 11 together with its extension 12 is set in longitudinal mechanical vibration. The upper portion of the nickel tube is cooled in order to dissipate the heat developed by the magnetic losses. To this end, a glass body 15 is placed over the tube 11, a glass tube 16 of a smaller diameter being inserted in the tube 11. Between the neck of the glass body 15 and the tube 11 is arranged a rubber sleeve 14. The tube 11 is closed just below the lower end of tube 16 by a nickel plate 17. The cooling water passes into the nickel tube 11 through the lower opening of the tube 16, reverses its direction of flow at the plate 17 and flows through the hollow space of the glass vessel 15 and through the connecting branch 18 back into the water cooling system.

The numeral 19 designates an aluminum sheet, a portion of which is to be provided with a tin coating 20 in order to unite it with another aluminum part or a body of another metal. The coating is applied to the aluminum sheet in the following manner:

Heat is applied to the aluminum sheet, for instance, by means of a Bunsen burner 21 and the sheet upon further application of heat is then pressed against the rounded-off end of the copper tubular extension 12 which is, as already mentioned set in mechanical vibration. At the same time, the solder 20 is applied to the surface of the aluminum sheet 19 and is distributed over the portion of the surface to be coated therewith by means of the tubular extension 12, heat being continuously applied thereto. This is continued until a uniform coating of the solder is produced.

Of course, soldering may be effected also with the aid of the usual soldering copper. In this case, the parts to be soldered are so pressed against the vibrating tube that the vibrations are imparted to the parts to be soldered in a reliable manner. The joint is treated as usual with the soldering copper, it being always essential that the parts at the joint be set in mechanical vibration. In the embodiment shown the soldering copper may be approached to the joint to be soldered laterally of the arrangement. However, the entire arrangement may also be operated in the inverted position so that the tubular extension 12 points in an upward direction; the soldering may then be effected from above by means of the soldering copper.

It is also possible to insert the solder between the two parts to be united, and press the two parts against the vibrating tubular extension and to apply heat thereto. In this manner very durable joints may be obtained.

The method according to the invention may also be employed in coating wires or bundles of wires with tin, for instance, in the manufacture of cable terminals. In this case, as shown in Fig. 3, the wires 22 are immersed in a container 24 filled with molten tin 23, the container being set in vibration as described above.

The vibrations are thereby transmitted from the container to the molten solder and to the wires to be coated. To impart the vibrations from the container to the wires in a more effective manner, it is preferable to press the wires when immersing them in the molten solder against any point of the vibrating container; for instance, against the bottom thereof.

Of course, it is also possible to set the wires in mechanical vibration by securing them, for instance, in a tube or to another metal support which vibrates. If another aluminum sheet is to be soldered to the aluminum sheet 19 it may be treated as described above, and the coated surface portions of the sheets may be arranged one upon the other and be united with one another by the application of heat.

Depending upon the thickness of the material of the parts to be united, the most favorable action may be obtained with the aid of different frequencies of mechanical vibration. In the case of mass production, for which the method according to the invention is very suitable, the most favorable frequency may be adjusted, for instance, for a number of work pieces with respect to a reference test piece and the individual pieces may be soldered one after the other. In general, the most favorable frequencies, as numerous tests have shown, lie outside of the range of the audible frequencies, which is an advantage, because as a result the described devices operate noiselessly.

What is claimed is:

1. Vibratory apparatus for use in forming a bond between a body and a metal applied thereto in a molten state, said apparatus comprising a coil, a core member which is adapted to be set in mechanical vibration by high frequency currents in said coil, and an applicator of high thermal conductivity secured to said core for engaging the body to be coated and transmitting vibrations thereto.

2. Vibratory apparatus as claimed in claim 1, in which the core is a nickel tube and the applicator is a copper cap rigidly secured to the tube.

3. Vibratory apparatus as claimed in claim 1, in which means is provided for artificially cooling the core.

4. Vibratory apparatus as claimed in claim 1, in which the core is a nickel tube, and in which means is provided for circulating a cooling fluid through that portion of the tube which is surrounded by the coil.

5. The method of soldering the end of a stranded cable, which consists in immersing the end portion of the cable in a bath of molten metal, and in subjecting the said end portion of the cable to high frequency mechanical vibrations while immersed in the bath.

6. The method of soldering the end of a stranded cable, which consists in preparing a bath of molten metal, in subjecting the vessel containing said bath to high frequency mechanical vibrations, in immersing the end portion of the cable in the bath, and in pressing the end of the cable against a wall of said vessel while immersed in the bath and while the vessel is vibrating.

7. The method of forming a bond between two metals, which consists in subjecting one metal to high frequency mechanical vibrations while in a solid state, in melting the other metal, and in bringing the solid and molten metals into contact while the solid metal is vibrating.

8. The method of forming a bond between two metals, which consists in subjecting one metal to high frequency mechanical vibrations, in bringing the second metal into contact with the first, and in melting the second metal while contact with the vibrating first metal is maintained.

9. The method of forming a bond between two metals, which consists in maintaining one of the metals in solid form in simultaneous contact with the other metal in molten form and with an elastic body, and in subjecting said body to high frequency mechanical vibrations.

10. The method of soldering which consists in contacting the parts to be joined, applying molten solder to the joint while vibrating the parts at a frequency above the audible range so as to produce adherent coatings on the parts, and maintaining the contact of the parts until the solder cools.

11. The method of soldering metal parts which consists in mechanically vibrating the parts at a frequency above the audible range at the point where they are to be joined, holding the parts together with the said points in contact, and applying molten solder to the junction of said points while they are vibrated.

12. The method of soldering which consists in holding the parts to be joined in contact with each other, vibrating at least one of the parts while so contacted at a frequency above the audible range, and simultaneously applying molten solder to the junction of the parts.

13. The method of producing an adherent coating of solder acting to mechanically unite metal parts to be joined together, said method consisting in coating the surfaces of the points of the parts to be contacted by applying molten solder to such points while mechanically vibrating such points at a frequency above the audible range until the molten solder adheres to such points, and holding solder coated points in contact and permitting the solder to cool.

14. The method of soldering a plurality of metallic parts together which consists in immersing the parts in a bath of molten solder and vibrating the parts at a frequency above the audible range while in contact with each other and immersed in the solder, so as to produce an adherent coating of solder on the parts and withdrawing the parts from the bath and the vibration while holding the parts in contact with each other and solidifying the adherent coating.

15. The method of soldering consisting in heating a metal body to a temperature sufficient to melt solder, applying solder to an area of the body so as to melt the solder thereon, then causing the molten solder to unite with the body by spreading the molten solder over said area with an element vibrating at a frequency above the audible range moved in contact with the molten solder and with said area of the body.

16. The method of uniting metal parts which consists in holding the parts in contact at the points where they are to be joined, placing solder between such points, applying heat so as to melt the solder and heat the parts, and mechanically vibrating the parts at least at the points of contact at a frequency above the audible range while the solder is in a molten condition, then withdrawing the heat and vibration and solidifying the solder while still holding the parts in contact.

17. The method of soldering metal parts together which consists in holding the parts in contact and placing solder at the junction of the parts and applying a hot soldering iron to melt the solder and heat the parts while vibrating the parts at a frequency above the audible range.

18. The method of soldering which consists in applying heat to a metal plate sufficient to melt solder, coating the plate by applying solder thereto whereby the solder melts, and contacting a vibrating element with the plate and the molten solder, said element being vibrated at a frequency above the audible range and moving said element over the surface of the plate so as to produce an adhering solder coating thereon, and then allowing the solder to solidify; and similarly coating another metal plate, then holding the plates with their solder coatings in contact and applying sufficient heat to fuse their solder coatings together and removing the heat to permit the fused coatings to solidify while so held.

HEINZ BARWICH.